US007506009B2

(12) United States Patent
Singh et al.

(10) Patent No.: US 7,506,009 B2
(45) Date of Patent: Mar. 17, 2009

(54) SYSTEMS AND METHODS FOR ACCESSING A SHARED STORAGE NETWORK USING MULTIPLE SYSTEM NODES CONFIGURED AS SERVER NODES

(75) Inventors: Sumankumar A. Singh, Pflugerville, TX (US); Peyman Najafirad, Austin, TX (US)

(73) Assignee: Dell Products LP, Round Rock, TX (US)

( * ) Notice: Subject to any disclaimer, the term of this patent is extended or adjusted under 35 U.S.C. 154(b) by 488 days.

(21) Appl. No.: 11/046,426

(22) Filed: Jan. 28, 2005

(65) Prior Publication Data

US 2006/0173851 A1 Aug. 3, 2006

(51) Int. Cl.
*G06F 12/00* (2006.01)
(52) U.S. Cl. .................. 707/204; 714/766; 711/207
(58) Field of Classification Search .................. 707/204
See application file for complete search history.

(56) References Cited

U.S. PATENT DOCUMENTS

| | | | |
|---|---|---|---|
| 4,410,941 A * | 10/1983 | Barrow et al. | 711/207 |
| 6,012,060 A | 1/2000 | Loaiza et al. | |
| 6,128,762 A * | 10/2000 | Jadav et al. | 714/766 |
| 6,237,001 B1 | 5/2001 | Bamford et al. | |
| 6,314,114 B1 | 11/2001 | Coyle et al. | |
| 6,333,936 B1 | 12/2001 | Johansson et al. | |
| 6,609,213 B1 | 8/2003 | Nguyen et al. | |
| 6,618,744 B1 | 9/2003 | Simmons et al. | |
| 2004/0024807 A1 | 2/2004 | Cabrera et al. | |
| 2008/0016028 A1* | 1/2008 | Wilding et al. | 707/1 |

OTHER PUBLICATIONS

Morse, "Application Scale-Out With The Dell PowerEdge 6650: Web Serving", Dell White Paper, Sep. 2003, pp. 1-10.
Kusnetzky, "Consolidating And Optimizing The Distributed Enterprise", IDC White Paper, Jul. 2002, 14 pgs.
"Oracle9i Real Application Clusters", Oracle White Paper, May 2001, pp. 1-25.

* cited by examiner

*Primary Examiner*—Cheyne D Ly
(74) *Attorney, Agent, or Firm*—O'Keefe, Egan, Peterman & Enders LLP

(57) ABSTRACT

Systems and methods for providing access to shared storage, for example, using multiple information handling system nodes configured as server nodes. Each server node is given ownership of different portions of data on the shared storage so that each portion of data is allowed to have only one owner at any given time. Data ownership information may be globally stored and used by the multiple server nodes to determine ownership and control access to a requested portion of data.

15 Claims, 5 Drawing Sheets

SYSTEMS AND METHODS FOR ACCESSING A SHARED STORAGE NETWORK USING MULTIPLE SYSTEM NODES CONFIGURED AS SERVER NODES

BACKGROUND OF THE INVENTION

1. Field of the Invention

This invention relates generally to data access, and more particularly to data access by multiple system nodes.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In modern computing architectures, applications execute on information handling systems configured as server nodes that access data stored on attached storage devices. Examples of server/storage architectures include storage area network (SAN), network attached storage (NAS) and direct attached storage (DAS) architectures. Many current applications utilize a shared-nothing architecture, meaning that the same data cannot be accessed by more than one application server node at a time. Examples of applications having a shared nothing architecture include MS SQL Server, MS Exchange, MySQL, etc. Because only one node is allowed to access a particular shared data at a time, shared nothing applications make application scale-out among multiple nodes difficult and cumbersome to implement. Due to difficulties involved with accessing shared nothing data from multiple server nodes, bandwidth is sometimes increased by scaling up the power of a single server node (e.g., up to 64 processors) rather than by scaling out application service capacity using multiple lower capacity server nodes (e.g., having up to 4 processors each). However, scaling up a server node means increasing the number of processors and complexity of the server. This serves to increase the cost of a server node, making it less flexible and more likely that it will be underutilized in some application serving environments.

Several conventional techniques have been implemented in an attempt to facilitate server scale out. In one of these conventional methods, two or more users are enabled to use two or more databases in active mode, with each acting as a real-time failover for the other. However, such a technique involves database replication and excludes shared storage. Database partitioning is another conventional methodology that has been employed in an attempt to scale out databases. However, when data is partitioned at the database level, one node cannot access a partition owned by another node, i.e., an application which is connected to one partition cannot access data from another partition. Furthermore, it is sometimes difficult to effectively physically partition a database due to interdependencies within the structures. A web server environment is another example of conventional scale out methodology. However, such an environment uses data replication and almost real time data synchronization. In yet another method for enabling scale out among multiple networked server nodes, when a requesting server node desires to access a requested piece of data, all other networked server nodes are queried to see if the data is contained within the memory of one of the networked server nodes. If the data is contained within the memory of one of the server nodes, it is fetched from the memory of the server node by the requesting server node for use.

SUMMARY OF THE INVENTION

Disclosed herein are systems and methods for providing access to shared storage, for example, using multiple information handling system nodes configured as server nodes. In one embodiment, the disclosed systems and methods may be advantageously implemented by introducing a new layer to handle all read-write contentions for the shared storage. In the architecture of this embodiment, each of the multiple server nodes may be configured to have access to the shared storage using a virtual scale out layer in a manner that is transparent to the application/s on the server nodes. Advantageously, the methodology of the disclosed systems and methods may be so configured to be transparent to the application(s), and so that no changes to the application(s) is required.

In one exemplary embodiment of the disclosed systems and methods, each server node is given access to different blocks of data on the shared storage. The data blocks may either be continuous or dispersed, and data ownership information may be globally stored (e.g., in a global file such as a global "data block partition table" which may contain the ownership information for all data blocks on the storage). In such an exemplary embodiment, the data ownership information may be allowed to change dynamically, but each data block is allowed to have only one owner at any given time (i.e., at any given time each storage block has a single fixed owner node and multiple nodes are not given permission to simultaneously access the storage block). When a Read/write request arrives, this data ownership information may be used by the multiple nodes to determine ownership of the requested data block. Thus, as will be described further herein, the globally available data ownership information (e.g., data block partition table) may be implemented to effectively control access to the shared storage.

In one embodiment of the disclosed systems and methods, a given server node may receive a Read/write request from a user (e.g., client or user), process the request, and decode the read/write block address (i.e., the address where the indicated data is located on shared storage). The given node may then access the data ownership information (e.g., read the data block partition table) to determine the owner of the corresponding data block(s) on shared storage. If the given node is the owner of the corresponding data block(s), it may continue with the transaction and respond to the client. However, if the given node is not the owner, it may determine the current owner of the corresponding data block(s) from the data ownership information, and forward the request to the current owner node of the data block(s) using, for example, private network connections.

When a request is received from another information handling system node, a current owner node may check to see if it is employing the requested data block(s) (e.g., has a lock on the requested data block(s) or the requested data block(s) is in memory or cache). If the current owner node is employing the requested data, it may take ownership of the requested transaction and signal the requesting node to abort the transaction. However, if the current owner node is not employing the requested data block(s), it may edit or otherwise alter the data ownership information (e.g., data block partition table) to make the requesting node the owner of the requested data block(s). In this latter case, the requesting node may then complete the requested transaction. In this embodiment, any changes made to the data ownership information may be propagated to all information handling system nodes sharing the data, e.g., using a private network inter-connect.

In one respect, disclosed herein is a system, including: at least one storage node; two or more data accessing nodes configured to access data stored on the storage node; and a virtual scale out layer including data ownership information, the data ownership information indicating portions of the data on the at least one storage node that is owned by each of the two or more data accessing nodes, each of the portions of the data being owned by only one of the two or more data accessing nodes at any given time. The data ownership information may be shared between each of the two or more data accessing nodes using the virtual scale out layer; and the data ownership information may be used to control access to the portions of the data on the at least one storage node by each of the two or more data accessing nodes.

In another respect, disclosed herein is a shared storage network, including: at least one storage node; and two or more server nodes configured to access a block of data stored on the storage node in response to a read/write request received from a user, each of the two or more server nodes including an information handling system. Blocks of the data on the at least one storage node are owned by only one of the two or more server nodes at any given time, and ownership of the blocks of data on the data storage node may be indicated by global data ownership information. A first one of the two more server nodes may be configured to access the global data ownership information to determine the owner of the block of data on the at least one storage node prior to accessing the block of the data on the storage node, and may be configured to access the block of data if the first one of the server nodes is the current owner of the block of data based on the data ownership information. The first one of the two more server nodes may also be configured to forward a request to access the block of data to a second one of the two or more server nodes if the second one of the server nodes is the current owner of the block of data based on the data ownership information.

In another respect, disclosed herein is a method for accessing data on at least one storage node coupled to two or more server nodes, including: receiving a read/write request from a user in a first one of the two or more server nodes, the read/write request requiring access to a portion of data on the at least one storage node; accessing global data ownership information in response to the read/write request to determine the owner of the portion of data on the at least one storage node prior to accessing the portion of the data on the storage node, the portions of the data on the at least one storage node being owned by only one of the two or more server nodes at any given time, and ownership of the portions of data on the data storage node being indicated by the global data ownership information; and accessing the portion of data to complete the read/write request if the first one of the server nodes is the current owner of the portion of data based on the data ownership information, or forwarding a request to access the portion of data to a second one of the two or more server nodes if the second one of the server nodes is the current owner of the portion of data based on the data ownership information.

DESCRIPTION OF ILLUSTRATIVE EMBODIMENTS

Figure 1:
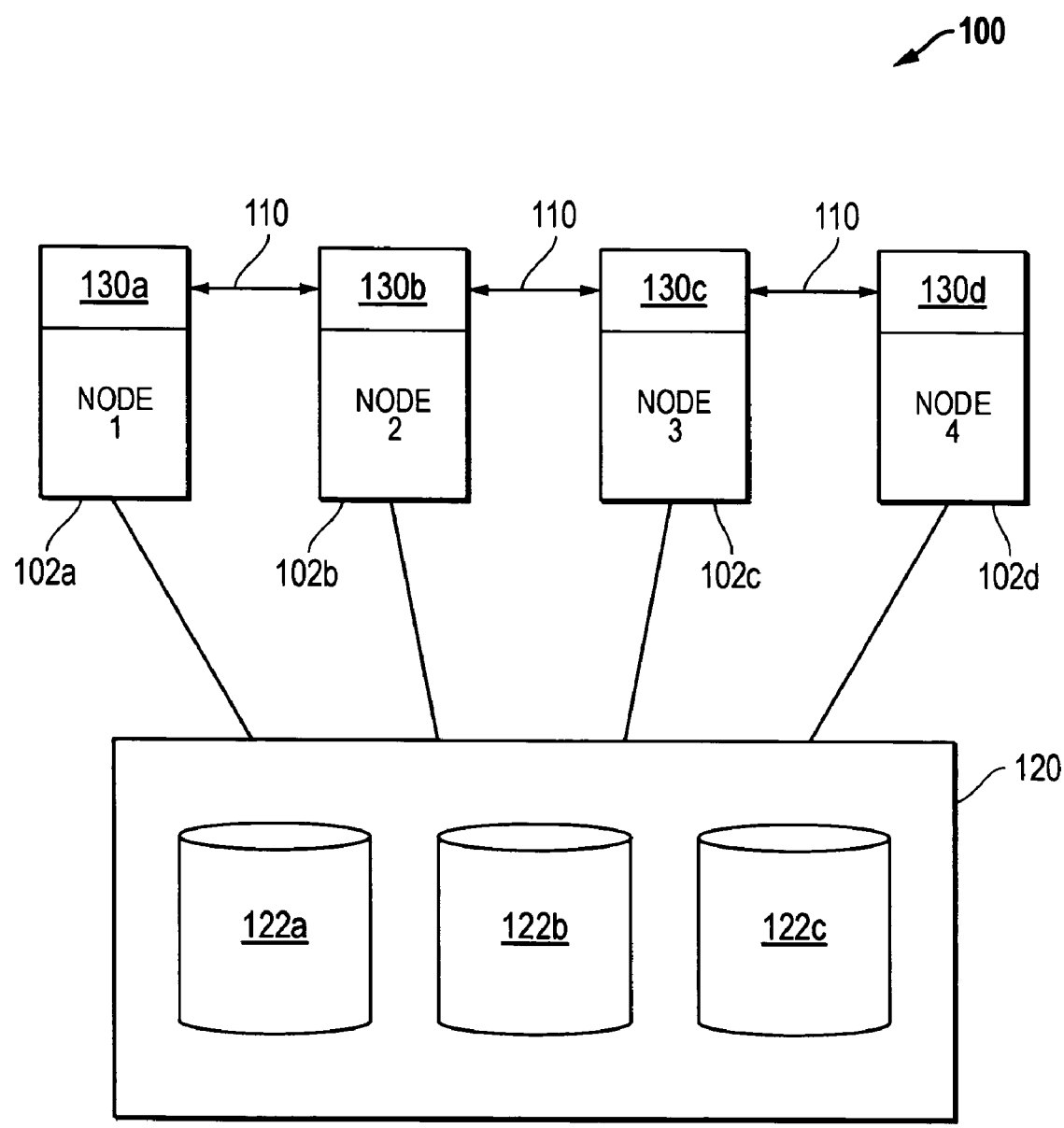
FIG. 1 is a block diagram of a shared storage network according to one exemplary embodiment of the disclosed systems and methods.

FIG. 1 is a block diagram of a shared storage network 100 configured according to one exemplary embodiment of the disclosed system and methods. As illustrated, network 100 includes multiple server nodes 102a, 102b, 102c and 102d that are each coupled to shared storage 120 which in this embodiment includes multiple storage devices 122a, 122b and 122c. In the illustrated embodiment, multiple server nodes 102 may be information handling systems (of the same or different type) configured to access data (e.g., read data and/or write data) on each of storage devices 122 of shared storage 120 as shown. Storage devices 122 may be any type of devices or combination of devices suitable for storing data such as hard drives or other non-volatile memory devices, e.g., containing magnetic or optical disks. Although FIG. 1 illustrates four server nodes 102 coupled to shared storage 120 in the form of three storage devices 122, it will be understood that the disclosed systems and methods may be implemented in any data access configuration where two or more data accessing nodes are coupled to access data (e.g., read data and/or write data) on a common storage node, e.g., two or more server nodes coupled to one or more storage devices. Specific examples of suitable storage system environments with which the disclosed systems and methods may be implemented include, but are not limited to, storage area networks, network attached storage, direct attached storage systems, disk arrays, etc.

Still referring to FIG. 1, each of multiple server nodes 102 is coupled to communicate with each of the other multiple server nodes 102 via inter-node communication paths 110, e.g., high speed interconnects such as Ethernet, Gigabit Ethernet or other suitable high speed network interconnects, etc. Each of server nodes 102 also includes data ownership information 130 that is globally stored on each server node. Any change to this data ownership is propagated to all server nodes. Data ownership information 130 may be present in any form suitable for associating given portions of owned data contained in shared storage 120 (e.g., portions of data contained on each of storage devices 122) with corresponding individual owner server nodes 130. In this regard, data ownership information 130 may be present as a global file/s that may be shared, modified and/or updated between server nodes 120 using inter-node communication paths 110, for example, as ownership of data in shared storage 102 is established or redistributed among server nodes 120 in a manner as will be described further herein.

Figures 2, 3:
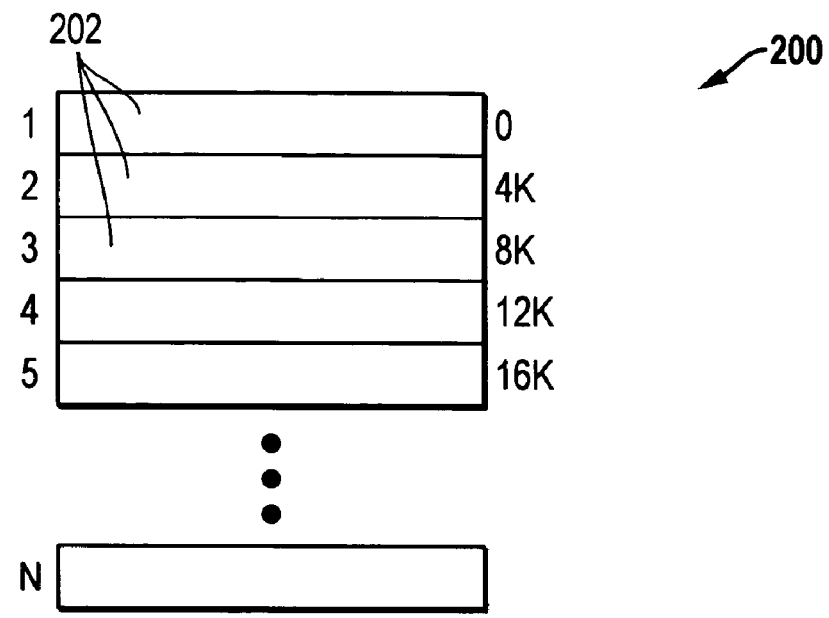
FIG. 2 is a simplified illustration of data block structure according to one exemplary embodiment of the disclosed systems and methods.
FIG. 3 illustrates one exemplary embodiment of data ownership information as it may be configured in the form of a data block partition table according to one exemplary embodiment of the disclosed systems and methods.

FIG. 2 shows a data block structure 200 of N data blocks 202 stored in the storage devices 122 of shared storage 120 of FIG. 1. In one embodiment, data blocks 202 may be the data blocks associated with a given application that is executing on server nodes 102 of FIG. 1, it being understood that data blocks of storage devices 122 may be associated with other applications executing on server nodes 102 of FIG. 1.

FIG. 3 illustrates one exemplary embodiment of data ownership information as it may be configured in the form of a data block partition table 300 containing the ownership information for the data blocks 202 of FIG. 2. As shown in FIG. 3, each server node 102 of FIG. 1 (i.e., Node 1, Node 2, Node 3, and Node 4) may be given ownership of particular data blocks 202 of shared storage 120. In one embodiment, data block partition table 300 may represent the data block ownership of data blocks 202 that are associated with one or more applications executing on server nodes 102. Examples of such applications include, but are not limited to, database applications (e.g., Microsoft SQL Server, Microsoft Exchange Server, MySQL, etc.), etc.

Figure 4:
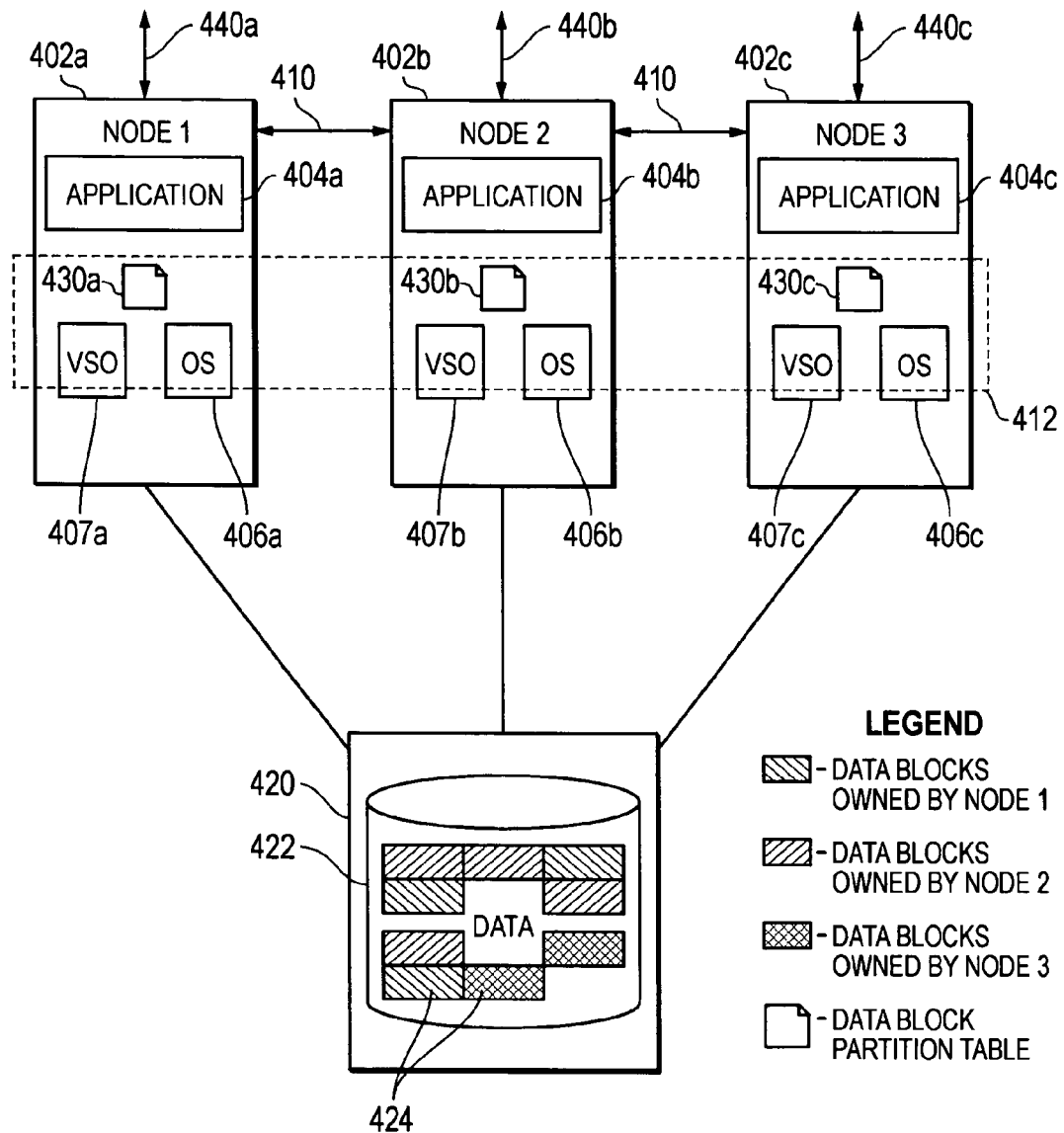
FIG. 4 is a block diagram of a shared storage network according to one exemplary embodiment of the disclosed systems and methods.

FIG. 4 is a block diagram of a shared storage network 400 configured according to another exemplary embodiment of the disclosed system and methods. As illustrated, network 400 includes multiple server nodes 402a, 402b, and 402c that are each coupled to shared storage 420, which in this embodiment includes a single storage device 422 that may be a storage device such as described elsewhere herein. In the illustrated embodiment of FIG. 4, multiple server nodes 402 may be information handling systems (of the same or different type) configured to access data (e.g., read data and/or write data) on each of storage devices 422 of shared storage 420 as shown. Storage device 422 may be any type of device suitable for storing data such as hard drive or other non-volatile memory device, e.g., containing magnetic or optical disk/s.

In the embodiment of FIG. 4, server nodes 402 are also shown coupled to communicate with users (e.g., to receive requests from users for data or data processing, to deliver data to users, etc.) via communication links 440, which may be network connections or other suitable communication links. Each of server nodes 402 is also coupled to communicate with each of the other multiple server nodes 402 via inter-node communication paths 410. As shown, each of server nodes 402 also includes operating system 406, virtual scale out logic 407, and an instance of application 404 executing on the server node. In this regard, virtual scale out logic 407 may be implemented in any form (e.g., software, firmware) that is suitable for performing one or more of the virtual scale out logic features described herein.

As shown in FIG. 4, each server node 402 of FIG. 4 (i.e., Node 1, Node 2, and Node 3) is given ownership of particular data blocks 424 of shared storage 420 that are associated with application 404 executing on server nodes 402. Ownership of different data blocks 424 by different server nodes 402 is represented in FIG. 4 by different cross hatching patterns. Each server node 402 is also provided with globally stored data ownership information in the form of a data block partition table 430 that may be provided, for example, in the form of data block 300 of FIG. 3. In this embodiment, data block partition table 430 is present as a global file which is stored on all connected server nodes. Each server node can modify data block ownership information stored in this file only if it is the current owner of that data block. Any changes/updates made to this file are propagated between server nodes 420 using inter-node communication paths 410, for example, as ownership of data in shared storage 402 is established or redistributed among server nodes 420 as described elsewhere herein. In the event that a given server node 420 fails or becomes inaccessible, then ownership of data blocks owned by the failed or inaccessible server node may be redistributed among the accessible and function server nodes. In this embodiment, data block partition table 430 and virtual scale out logic 407 of server nodes 402 form a virtual scale out layer 412 that extends between server nodes 420.

Figure 5:
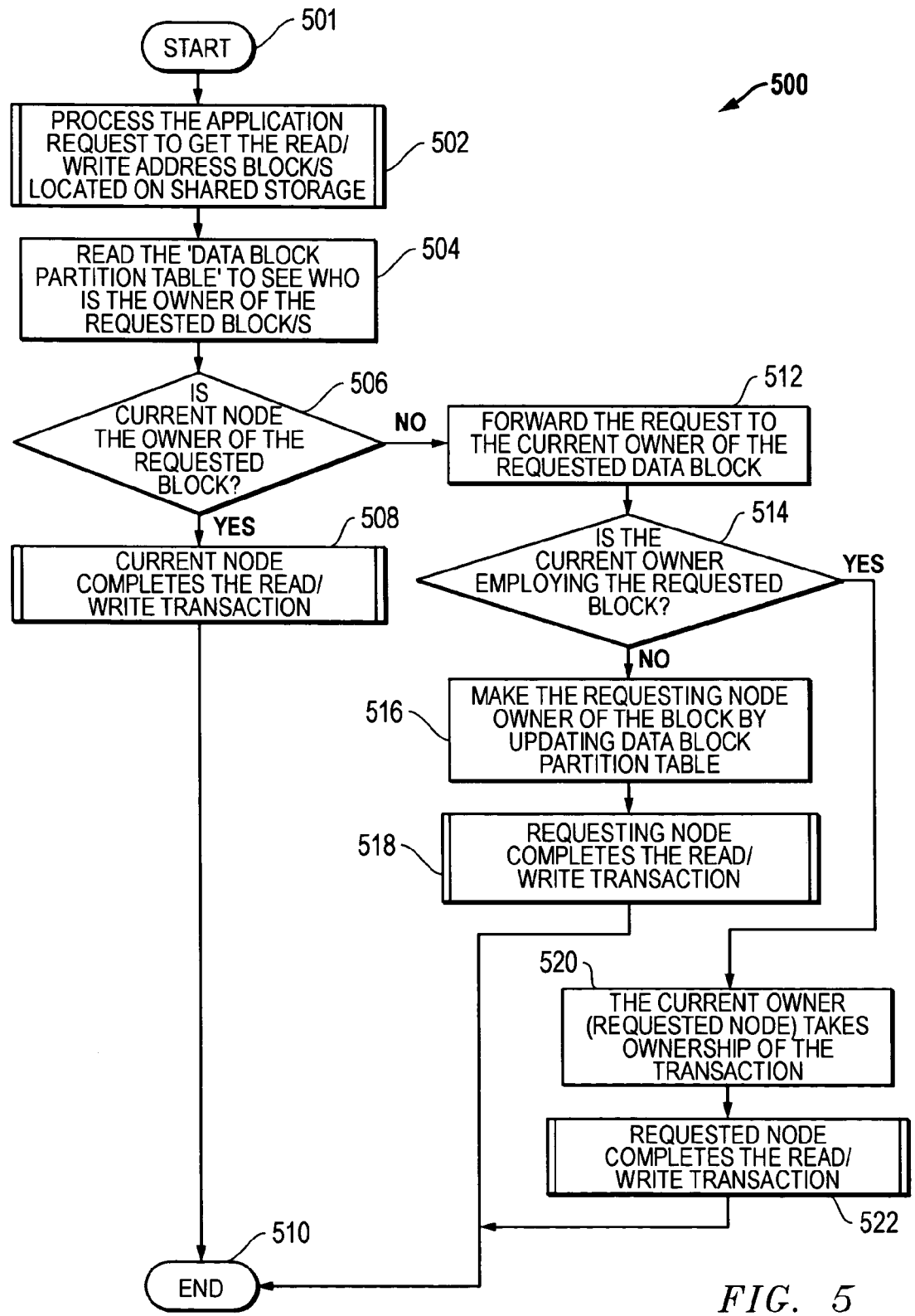
FIG. 5 illustrates one exemplary embodiment of data access methodology according to one exemplary embodiment of the disclosed systems and methods.

FIG. 5 illustrates one exemplary embodiment of data access methodology 500 that may be implemented, for example, using the exemplary embodiment of FIG. 4. In this regard, the methodology of FIG. 5 is described as follows in relation to operation of server node 402b, it being understood that the same exemplary operation methodology is implemented at the same time with regard to server nodes 402a and 402c of FIG. 4.

In this embodiment, application 404b of server node 402b is configured to receive a read/write query (e.g., from a user) for data contained in shared storage 420 via communication link 440b. Application 404b converts the data query to a virtual data address and passes this virtual address as an application request to the corresponding operating system 406b of server node 402b in step 501 of methodology 500. Operating system 406b in turn processes the application request in step 502 by converting this virtual data address to a physical storage address (read/write address block/s) located on shared storage 420. Scale out logic 407 accesses data block partition table 430b in step 504 and in step 506 determines if the physical address of data block/s 424 corresponding to the requested data is owned by the current server node 402b, or owned by one of the other server nodes 402a or 402c. If data blocks 424 of the requested data are owned by current server node 402b, then application 404b of the current server node 402b is allowed to complete the read/write transaction with respect to the requested block/s contained in shared storage 420, and methodology 500 ends in step 510.

However, if scale out logic 407 determines in step 506 that the physical address of data block/s 424 corresponding to the requested data is currently owned by one of the other server nodes (e.g., server node 402a), then server node 402b forwards the request to the current owner server node 402a in step 512 via inter-node communication path 410. Upon receipt of the request from server node 402b, virtual scale out logic 407a of server node 402a determines in step 514 if the current owner server node 402a is employing the requested data block/s 424 (e.g., has the requested data block/s 424 in memory or cache, or has a lock on it). If the current owner server node 402a is not employing the requested data block/s 424, then virtual scale out logic 407a of server node 402a updates global data block partition table 430a, 430b, 430c via internode communication paths 410 to make the requesting server node 402b the current owner of the requested data block/s 424 in step 516. The requesting server node 402b then completes the read/write transaction in step 518 with respect to the requested data block/s contained in shared storage 420, as it is now the owner of the requested data block and methodology 500 ends in step 510.

In the event that virtual scale out logic 407a determines in step 514 that the current owner server node 402a is employing the requested data block/s 424, then the current owner server node 402*a* takes ownership of the requested read/write transaction in step 520 and signals the requesting node 402*b* to abort the transaction. The current owner server node 402*a* then completes the read/write transaction in step 522 with respect to the requested data block/s contained in shared storage 420, and methodology 500 ends in step 510.

It will be understood that methodology 500 of FIG. 5 is exemplary only, and that the disclosed systems and methods may be implemented using any methodology (e.g., including fewer, additional or alternative steps) in which globally stored data ownership information is employed to determine the owner server node of requested data block/s of shared storage, and to determine which server node processes a corresponding read/write data request for these data block/s received from a user by forwarding a request to the current owner node of the data block(s) and determining if the current owner node is employing the requested data block/s. For example, in one alternative embodiment to the methodology 500 FIG. 5, when the scale out logic of a first server node determines in step 506 that the physical address of data block/s corresponding to requested data is currently owned by another server node, the first server node may forward the corresponding read/write request to the current owner server node for completion of the read/write transaction (e.g., skipping directly from step 512 to steps 520 and 522) without intervening step 514.

In another alternative embodiment to the methodology of FIG. 5, when the scale out logic of a first server node determines in step 506 that the physical address of data block/s corresponding to requested data is currently owned by another server node, the first server node may ping the current owner server node to determine if the current owner server node is employing the requested data block/s rather than forwarding the request to the current owner sever node (e.g., skipping step 512). If the current owner server node responds that it is not employing the requested data block/s, then the first server node may take ownership of the requested data block/s, update the globally stored data ownership information and complete the requested read/write transaction. If the current owner node responds that it is employing the requested data block/s, then the first server node may forward the request to the current owner server node for completion of the requested transaction.

Figure 6:
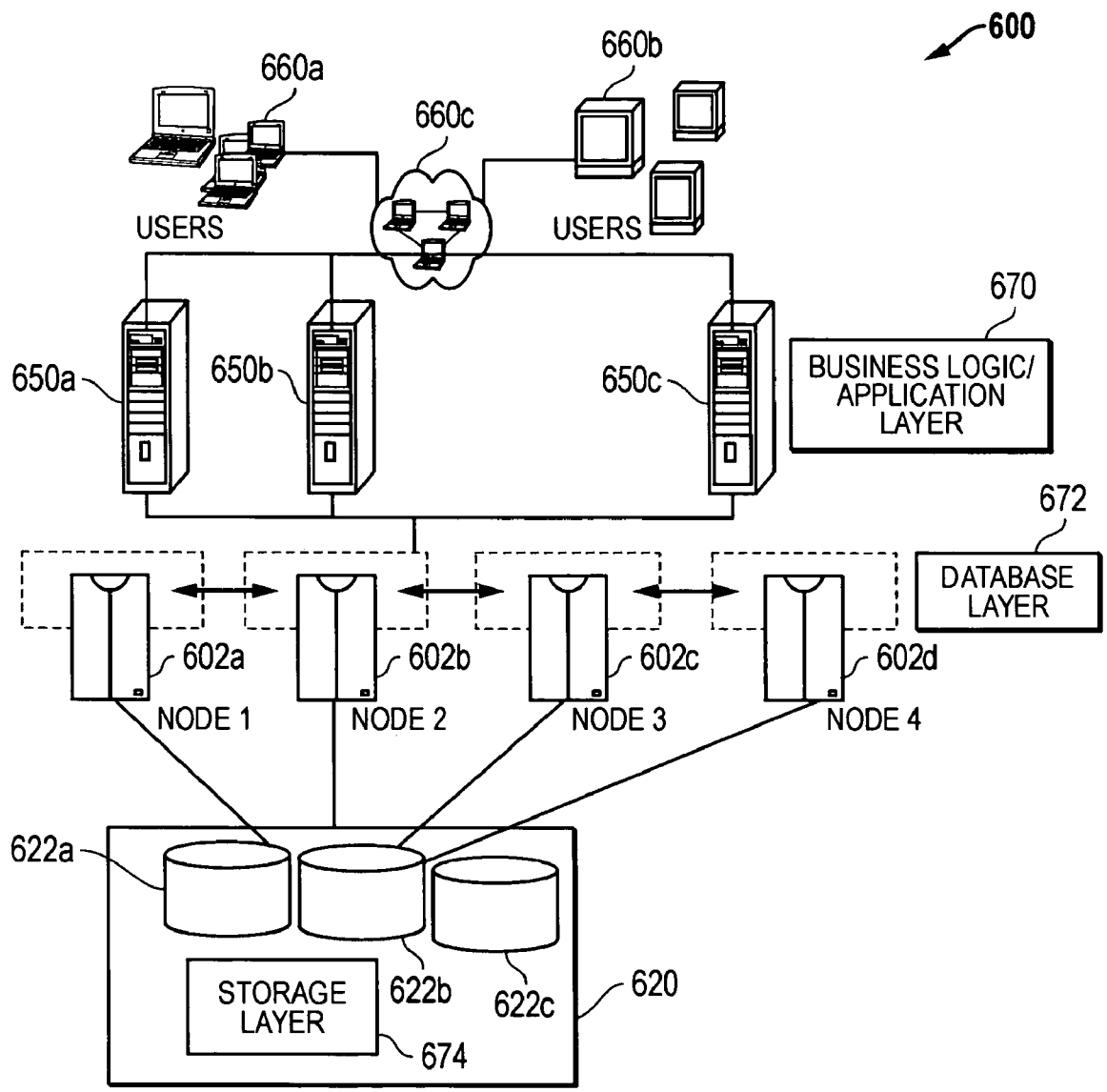
FIG. 6 illustrates a data access network architecture according to one exemplary embodiment of the disclosed systems and methods.

FIG. 6 illustrates one exemplary embodiment of a data access network architecture 600 that may be implemented to provide multiple users 660*a*, 660*b* (e.g., various clients anywhere on the Internet) access to shared data on shared storage 620. As shown, access to shared data on shared storage 620 may additionally or alternatively be provided to local network users 660*c* (e.g., clients within a corporate/local network). As illustrated in FIG. 6, data access architecture includes a business logic application layer 670, a database layer 672 and a storage layer 674. In the embodiment of FIG. 6, storage layer 674 includes shared storage 620 that is coupled to multiple server nodes 602, and includes multiple storage devices 622 that contain blocks of data (e.g., such as a data block structure 200 of FIG. 2). The clients 660 pass their request to application servers 650. The Application server nodes 650 process the request and pass on data read/write request to any of database server nodes 602.

In the embodiment of FIG. 6, users 660 may be coupled to communicate with other components of data access network architecture 600 using any suitable communication medium, e.g., wireless, hardwire, over the internet etc. Users 660 may be, for example, portable information handling systems such as notebook computers or PDAs, desktop information handling systems such as desktop PCs, or any other information handling systems or combinations thereof capable of issuing a read/write request. Multiple application server nodes 650 accept requests from clients 660. The application servers 650 convert the client requests to read/write requests and pass on the request to any one of the database server nodes 602. Multiple server nodes 602 and shared storage 620 may be configured as a shared storage network, such as has been previously described in relation to FIGS. 1 and 4 herein.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A shared storage network, comprising:
  at least one storage node;
  two or more server nodes configured to access blocks of data stored on said storage node in response to a read/write request received from a client or user, each of said two or more server nodes comprising an information handling system and including an operating system executing thereon; and
  a virtual scale out layer operating and extending between said two or more server nodes at a layer above the operating system layer, said virtual scale out layer including virtual scale out logic and global data ownership information, said virtual scale out layer communicating between each of said two or more server nodes via at least one internode communication path, and said global data ownership information being globally stored on each of said two or more server nodes such that any change to said global data ownership information is propagated to all of said two or more server nodes;
  wherein each of said two or more server nodes comprises at least one shared nothing application executing on said server node; and wherein each of said two or more server nodes is configured to access said blocks of data stored on said same storage node through said virtual scale out layer in response to a read/write request received by said at least one shared nothing application from said client or user;

wherein each block of said data on said at least one storage node is owned by only one of said two or more server nodes at any given time, wherein each of said two or more server nodes owns at least one data block on the same said storage node at the same time, and wherein ownership of said blocks of data on said data storage node is indicated by global data ownership information;

wherein said virtual scale out layer is configured to access said global data ownership information to determine the owner of said block of data on said at least one storage node prior to said first one of said two or more server nodes accessing said block of said data on said storage node;

wherein said first one of said two more server nodes is configured to access said block of data if said virtual scale out layer determines that said first one of said server nodes is the current owner of said block of data based on said data ownership information; and wherein said first one of said two more server nodes is configured to forward a request to access said block of data to a second one of said two or more server nodes if said virtual scale out layer determines that said second one of said server nodes is the current owner of said block of data based on said data ownership information.

2. The shared storage network of claim 1, wherein said global data ownership information comprises a global data block partition table.

3. The shared storage network of claim 1, wherein said second one of said two or more server nodes is configured to access said block of data only if said virtual scale out layer determines that said second one of said two or more server nodes is employing said block of said data.

4. The shared storage network of claim 3, wherein said global data ownership information is configured to be changed by said virtual scale out layer to indicate that said first one of said two or more server nodes is the current owner of said block of data if said second one of said two or more server nodes is not employing said block of data when said request to access said block of said data is received by said second one of said two or more server nodes; and wherein said first one of said two or more server nodes is configured to access said block of data if said second one of said two or more server nodes is not employing said block of data when said request to access said block of said data is received by said second one of said two or more server nodes from said first one of said two or more server nodes.

5. A method for accessing data on at least one storage node coupled to two or more server nodes, comprising:
    providing a shared storage network, comprising:
        at least one storage node, and
        two or more server nodes configured to access blocks of data stored on said storage node in response to a read/write request received from a client or user, each of said two or more server nodes comprising an information handling system and including an operating system executing thereon,
        a virtual scale out layer operating and extending between said two or more server nodes at a layer above the operating system layer, said virtual scale out layer including virtual scale out logic and global data ownership information, said virtual scale out layer communicating between each of said two or more- server nodes via at least one internode communication path, and said global data ownership information being globally stored on each of said two or more server nodes such that any change to said global data ownership information is propagated to all of said two or more server nodes;

receiving a read/write request from a client or user in a first one of said two or more server nodes, said read/write request requiring access to a portion of data on said at least one storage node;

using said virtual scale out layer to access global data ownership information in response to said read/write request to determine the owner of said portion of data on said at least one storage node prior to accessing said portion of said data on said storage node, each portion of said data on said at least one storage node being owned by only one of said two or more server nodes at any given time, each of said two or more server nodes owning at least a portion of said data on the same said storage node at the same time, and ownership of said portions of data on said data storage node being indicated by said global data ownership information; and accessing said portion of data to complete said read/write request if said first one of said server nodes is the current owner of said portion of data based on said data ownership information, or forwarding a request to access said portion of data to a second one of said two or more server nodes if said second one of said server nodes is the current owner of said portion of data based on said data ownership information;

wherein each of said two or more server nodes comprises an information handling system and at least one shared nothing application executing on said information handling system; wherein said portion of data comprises at least one block of data; and wherein each of said two or more server nodes is configured to access said blocks of data stored on said same storage node through said virtual scale out layer in response to a read/write request received by said at least one shared nothing application from said client or user.

6. The method of claim 5, wherein said operating system of said two or more server nodes and said virtual scale out layer are in communication with said at least one shared nothing application; and wherein said method further comprises:
    using said at least one shared nothing application to convert said read/write request to a virtual data address that is communicated as an application request to said operating system of said first one of said two or more server nodes;
    using said operating system of said first one of said two or more server nodes to process said application request by converting said virtual data address to a physical storage address located on said at least one storage node; and
    using said virtual scale out layer to access said global data ownership information to determine if the physical address of said block of data is owned by said first one of said two or more server nodes.

7. The method of claim 6, further comprising:
    receiving said request to access said block of data in said second one of said two or more server nodes from said first one of said two or more server nodes;
    using said virtual scale out layer to determine if said second one of said two or more server nodes is employing said block of data when said request to access said block of data is received by said second one of said two or more server nodes from said first one of said two or more server nodes; and
    accessing said block of data with said second one of said two or more server nodes to complete said read/write request if said second one of said two or more server nodes is employing said block of data when said request to access said block of data is received by said second one of said two or more server nodes from said first one of said two or more server nodes.

8. The method of claim 6, further comprising:
- receiving said request to access said block of data in said second one of said two or more server nodes from said first one of said two or more server nodes;
- using said virtual scale out layer to determine if said second one of said two or more server nodes is employing said block of data when said request to access said block of data is received by said second one of said two or more server nodes from said first one of said two or more server nodes; and
- using said virtual scale out layer to change said data ownership information to indicate that said first one of said two or more server nodes is the current owner of said block of data if said second one of said two or more server nodes is not employing said portion of data when said request to access said portion of data is received by said second one of said two or more server nodes; and
- accessing said block of data with first one of said two or more server nodes to complete said read/write request if said second one of said two or more server nodes is not employing said block of data when said request to access said block of said data is received by said second one of said two or more server nodes.

9. The method of claim 5, wherein said global data ownership information comprises a global data block partition table.

10. The method of claim 5, further comprising accessing said portion of data with said second one of said two or more server nodes to complete said read/write request if said second one of said two or more server nodes is employing said portion of data when said request to access said portion of data is received by said second one of said two or more server nodes.

11. The method of claim 5, further comprising changing said global data ownership information to indicate that said first one of said two or more server nodes is the current owner of said portion of data if said second one of said two or more server nodes is not employing said portion of data when said request to access said portion of data is received by said second one of said two or more server nodes, said change in said global data ownership information being propagated to all of said two or more server nodes; and accessing said portion of data with first one of said two or more server nodes to complete said read/write request if said second one of said two or more server nodes is not employing said portion of data when said request to access said portion of said data is received by said second one of said two or more server nodes.

12. The shared storage network of claim 1, wherein each of said two or more server nodes is configured to access said block of data through said virtual scale out layer in a manner that is transparent to said at least one shared nothing application executing on each of said server nodes, and such that no changes to said shared nothing applications is required.

13. The method of claim 5, wherein each of said two or more server nodes is configured to access said block of data through said virtual scale out layer in a manner that is transparent to said at least one shared nothing application executing on each of said server nodes, and such that no changes to said shared nothing applications is required.

14. The shared storage network of claim 1, wherein said at least one storage node is a single storage network, and wherein each of said two or more server nodes owns at least one data block on said single storage node at the same time.

15. The method of claim 5, wherein said at least one storage node is a single storage network, each of said two or more server nodes owning at least a portion of said data on said single storage node at the same time.

* * * * *